(12) United States Patent
Milby et al.

(10) Patent No.: US 8,799,267 B2
(45) Date of Patent: Aug. 5, 2014

(54) OPTIMIZING STORAGE ALLOCATION

(75) Inventors: Gregory Howard Milby, San Marcos, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 915 days.

(21) Appl. No.: 11/778,122

(22) Filed: Jul. 16, 2007

(65) Prior Publication Data

US 2009/0024678 A1  Jan. 22, 2009

(51) Int. Cl.
*G06F 17/30* (2006.01)
*G06F 3/06* (2006.01)

(52) U.S. Cl.
CPC .............. *G06F 3/0631* (2013.01); *G06F 3/067* (2013.01); *G06F 3/0613* (2013.01)
USPC .......................................... 707/713; 707/812

(58) Field of Classification Search
CPC ..................... G06F 17/30477; G06F 17/30442
See application file for complete search history.

(56) References Cited

U.S. PATENT DOCUMENTS

| | | | |
|---|---|---|---|
| 5,317,731 A | | 5/1994 | Dias et al. |
| 5,355,475 A | * | 10/1994 | Tanaka et al. ................. 707/829 |
| 5,694,591 A | | 12/1997 | Du et al. |
| 5,884,320 A | | 3/1999 | Agrawal et al. |
| 5,903,909 A | * | 5/1999 | Pehkonen ...................... 711/122 |
| 6,092,062 A | * | 7/2000 | Lohman et al. ........................ 1/1 |
| 6,535,972 B1 | * | 3/2003 | Mahurin et al. .............. 712/217 |
| 6,584,457 B1 | | 6/2003 | Kasao et al. |
| 6,732,096 B1 | * | 5/2004 | Au ................................... 707/5 |
| 6,745,191 B2 | | 6/2004 | Kasao et al. |
| 6,801,903 B2 | | 10/2004 | Brown et al. |
| 7,024,414 B2 | * | 4/2006 | Sah et al. ....................... 707/101 |
| 7,054,852 B1 | | 5/2006 | Cohen |
| 7,155,428 B1 | | 12/2006 | Brown et al. |
| 7,185,000 B1 | | 2/2007 | Brown et al. |
| 7,234,112 B1 | | 6/2007 | Brown et al. |
| 7,383,270 B1 | * | 6/2008 | Kostamaa et al. ............. 707/101 |
| 7,464,070 B2 | * | 12/2008 | Yagawa ................................ 1/1 |
| 7,574,424 B2 | * | 8/2009 | Chowdhuri ....................... 707/3 |
| 2001/0000536 A1 | * | 4/2001 | Tarin ............................. 707/102 |
| 2004/0181523 A1 | * | 9/2004 | Jardin .............................. 707/3 |
| 2006/0136396 A1 | * | 6/2006 | Brobst ............................. 707/3 |
| 2006/0218123 A1 | * | 9/2006 | Chowdhuri et al. ............. 707/2 |
| 2007/0136346 A1 | * | 6/2007 | Morris et al. ................. 707/101 |
| 2008/0086446 A1 | * | 4/2008 | Zhang et al. ..................... 707/2 |

* cited by examiner

*Primary Examiner* — Ajay Bhatia
*Assistant Examiner* — Miranda Huang
(74) *Attorney, Agent, or Firm* — Schwegman, Lundberg & Woessner, P.A.

(57) ABSTRACT

There is provided a method, a system and a machine readable medium to optimize storage allocation in a database management system. The method comprises receiving a processing step at a step processing module of an access module processor from a dispatcher module. The method further comprises determining whether a fast access storage flag is set in the processing step, the fast access storage flag indicating use of an intermediate file in fast access storage to store one or more redistributed data rows of a table of a database that is distributed across one or more storage devices of the database management system; Yet further the method comprises selectively allocating a free fast access storage data block to the intermediate file from a fast access storage pool based on the determination that the fast access storage flag is set. Lastly, the method comprises writing a redistributed data row from the one or more redistributed data rows to the allocated fast access storage data block.

18 Claims, 9 Drawing Sheets

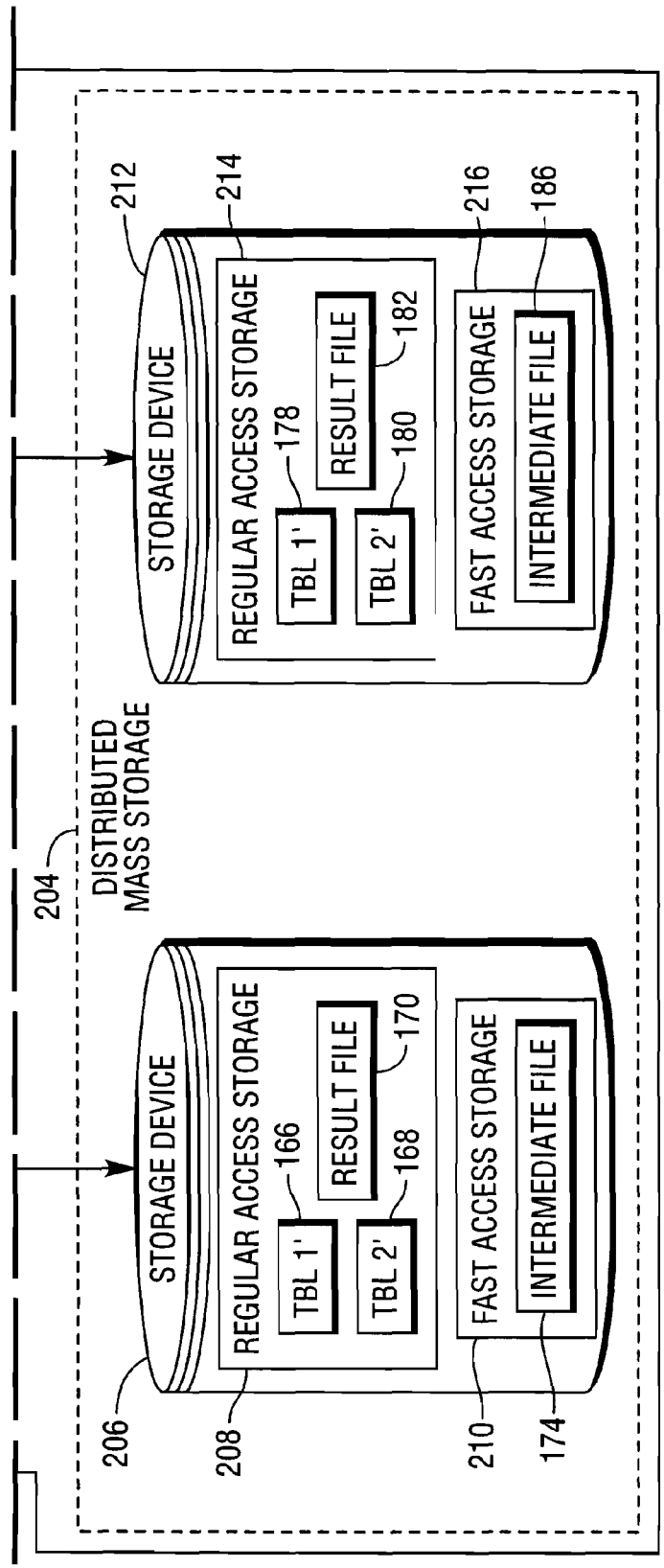
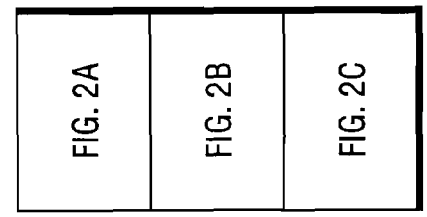

OPTIMIZING STORAGE ALLOCATION

TECHNICAL FIELD

This disclosure relates to database management systems. More particularly, this disclosure is directed to optimizing storage allocation in a database management system (DBMS).

BACKGROUND

In general, a database management system (DBMS) provides the ability to store, modify and extract information from a database. The database is generally maintained in a mass storage (e.g., hard disk, tape drive, optical disk, and the like). The DBMS may receive one or more queries (e.g., structure query language (SQL) queries) to provide access (e.g., store, modify, extract) to the database. DBMS performance is constrained, among other things, by the architecture on which the DBMS operates, including processor speed and input/output (I/O) speed of mass storage. To meet increasing demand for DBMS performance, vendors have employed improved system architectures and processors, parallel processing (via single or multiple processors), a variety of mass storage techniques, as well as myriad other software and hardware techniques.

While improvements in the foregoing areas have improved DBMS performance considerably, mass storage I/O remains one of the greatest bottlenecks to DBMS performance. More specifically, I/O execution time to access mass storage plays a major role in determining the speed by which queries of the database may be resolved. For example, the resolution of a query may require the creation and manipulation of an associated one or more intermediate files. If an intermediate file is small enough, it is typically cached in file system cache memory. However, if the intermediate file exceeds a size threshold, typically a percentage of file system cache size, then the file is generally stored in slower mass storage device. Therefore, the resolution of the query having intermediate files stored in mass storage, requires the processor to first write the intermediate files to mass storage and later read the intermediate files from mass storage.

In view of the foregoing, the speed with which the intermediate files can be accessed (e.g., written to and read from mass storage) plays an important yet detrimental role in the overall DBMS performance. Consequently, improving the I/O execution time necessary to access the intermediate files ultimately improves DBMS performance in the execution of the query associated with the intermediate files.

SUMMARY

In accordance with an embodiment, there is provided a method to optimize storage allocation in a database management system, the method comprising: receiving a processing step at a step processing module of an access module processor from a dispatcher module; determining whether a fast access storage flag is set in the processing step, the fast access storage flag indicating use of an intermediate file in fast access storage to store one or more redistributed data rows of a table of a database that is distributed across one or more storage devices of the database management system; selectively allocating a free fast access storage data block to the intermediate file from a fast access storage pool based on the determination that the fast access storage flag is set; and writing a redistributed data row from the one or more redistributed data rows to the allocated fast access storage data block.

In accordance with another embodiment, there is provided a database management system to optimize storage allocation, the database management system comprising: an access module processor comprising: a step processing module to receive a processing step from a dispatcher module; and a file system to: determine whether a fast access storage flag is set in the processing step, the fast access storage flag indicating use of an intermediate file in fast access storage to store one or more redistributed data rows of a table of a database that is distributed across one or more storage devices of the database management system; selectively allocate a free fast access storage data block to the intermediate file from a fast access storage pool based on the determination that the fast access storage flag is set; and write a redistributed data row from the one or more redistributed data rows to the allocated fast access storage data block.

In accordance with a further embodiment, there is provided a machine-readable medium including instructions executable by the machine for optimizing storage allocation in a database management system, the instructions causing the machine to: receive a processing step at a step processing module of an access module processor from a dispatcher module; determine whether a fast access storage flag is set in the processing step, the fast access storage flag indicating use of an intermediate file in fast access storage to store one or more redistributed data rows of a table of a database that is distributed across one or more storage devices of the database management system; selectively allocate a free fast access storage data block to the intermediate file from a fast access storage pool based on the determination that the fast access storage flag is set; and write a redistributed data row from the one or more redistributed data rows to the allocated fast access storage data block.

BRIEF DESCRIPTION OF THE DRAWINGS

Various features and attendant advantages of the example embodiments will be more fully appreciated as the same becomes better understood when considered in conjunction with the accompanying drawings, in which like reference characters designate the same or similar parts throughout the several views, and wherein:

FIG. 5 is a diagrammatic representation of machine in an example form of a computer system within which a set of

DETAILED DESCRIPTION

Figure 1A:
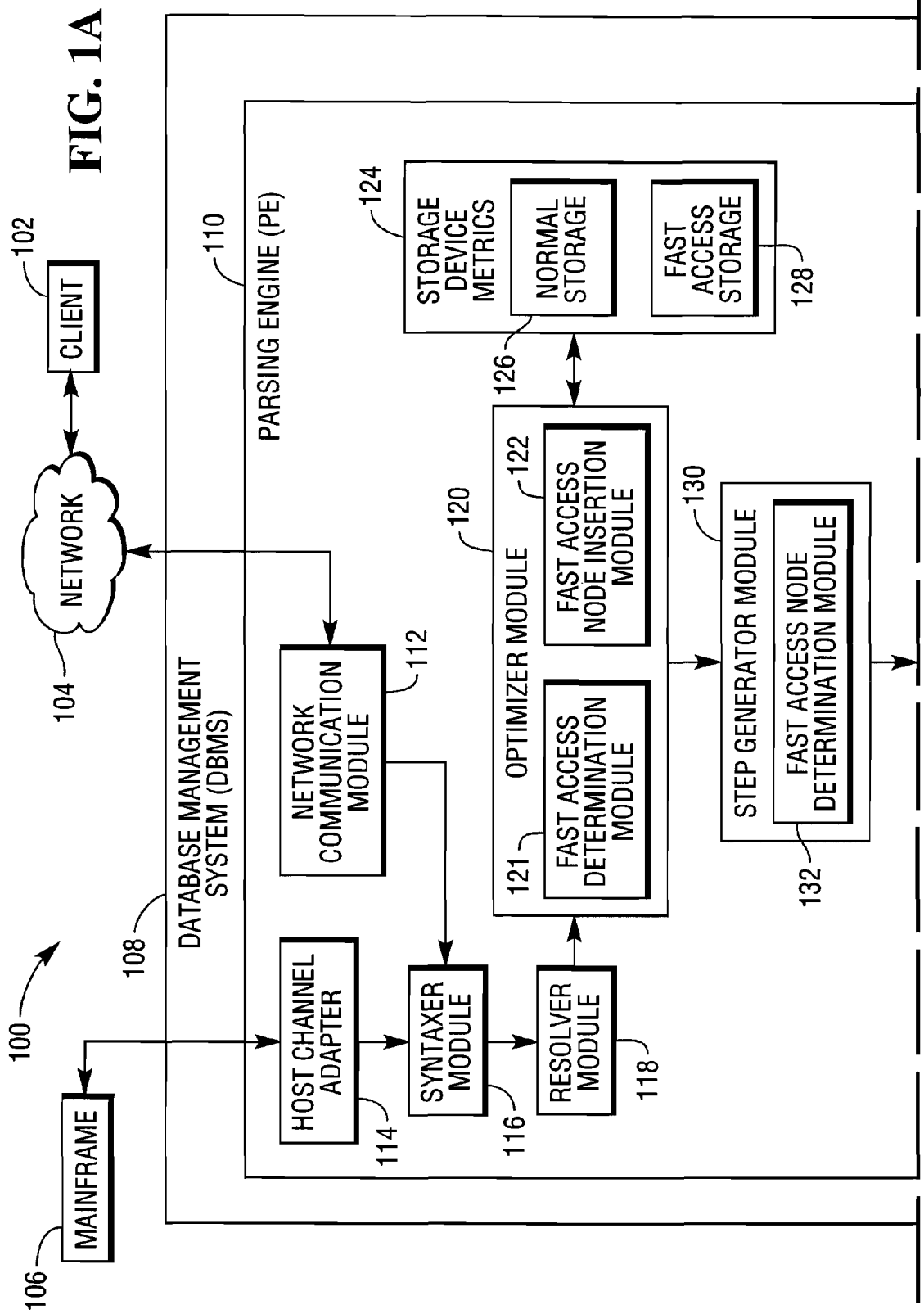
FIG. 1 is an example query system including an example parallel processing database management system (DBMS) that provides fast access storage for one or more intermediate files associated with the execution of a query from one or more requesting systems.
Figure 1B:
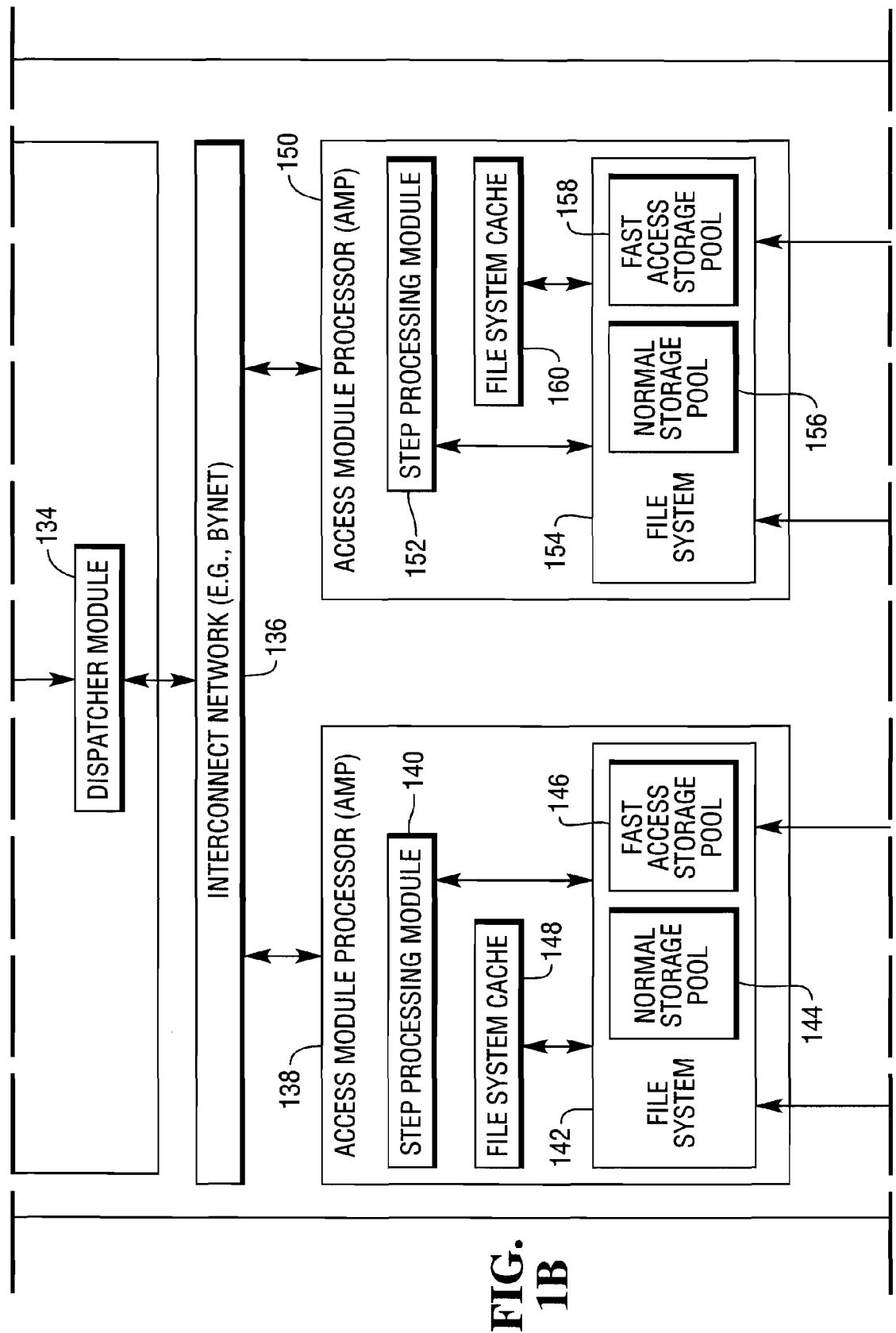
Figure 1C:
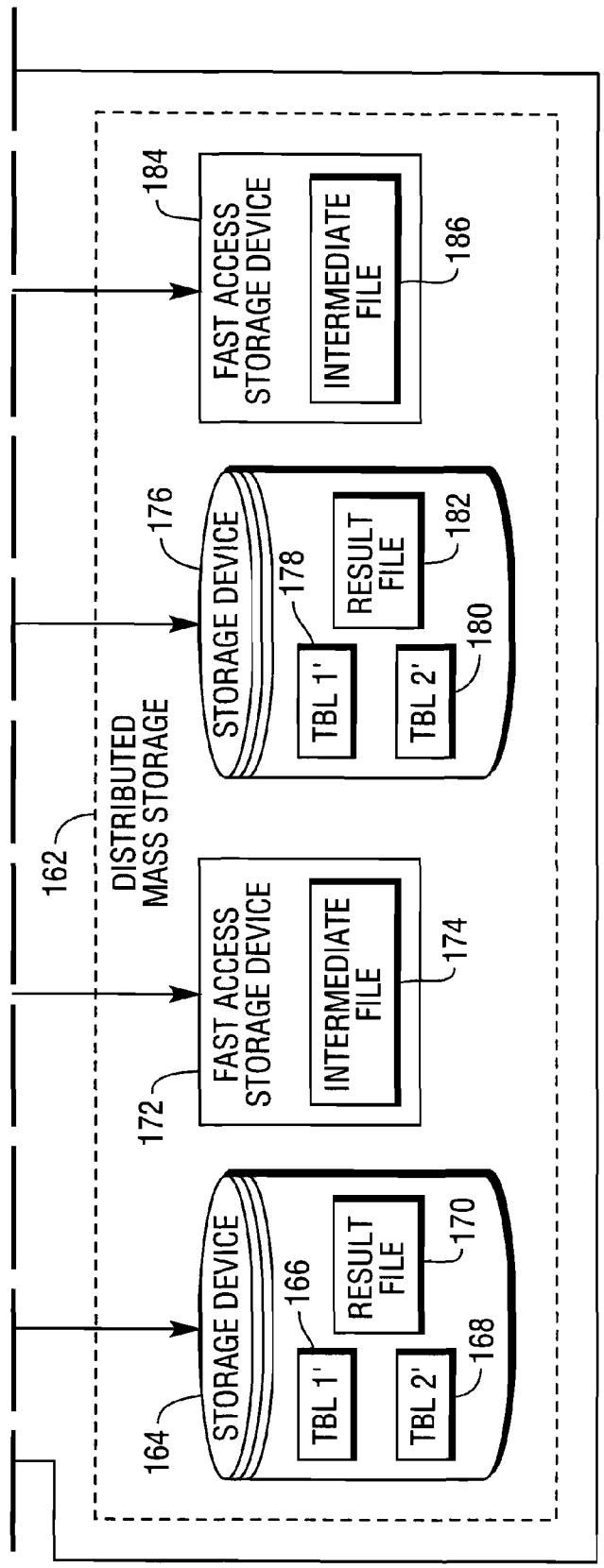
Figure 1:
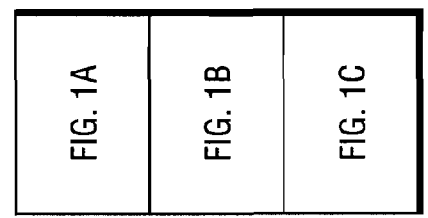

FIG. 1 is an example query system 100 including an example parallel processing database management system (DBMS) 108 that provides fast access storage 172, 184 for one or more intermediate files 174, 186 associated with the execution of a query or a request from one or more requesting systems 102, 106. The requesting systems may include a network client 102, a mainframe 106, as well as other devices. The query or request may be a structured query language (SQL) query executed against a database (e.g., including plural tables 166, 168, 178, 180) distributed amongst plural storage devices 164 and 176 in distributed mass storage 162. The DMBS 108 includes a parsing engine (PE) 110, an interconnect network 136, one or more access module processors (AMPs) 138, 150, and the distributed mass storage 162.

Further with reference to FIG. 1, the parsing engine 112 and associated AMPs 138, 150 may be virtual processes executed by the DBMS 108. The parsing engine 110 communicates with requesting systems 102, 106 to receive a query (or multiple queries) against the distributed database stored in distributed mass storage 162. As the requesting system may be mainframe 106, the PE 112 includes a host channel adapter 114 to receive one or more queries from the mainframe 106. Furthermore, as the requesting system may also be a network client 102, the PE 112 further includes a network communication module 112 to receive one or more queries from the network client 102 via communication network 104. The communication network 104 may be any conventional network, including the Internet, Wide Area Network (WAN), Metropolitan Area Network (MAN), Campus Area Network (CAN), Local Area Network (LAN), Home Area Network (HAN), wireless (802.11), satellite network, as well as different combinations thereof.

Still further with reference to FIG. 1, the syntaxer module 116 verifies the syntax of the received query (e.g., SQL request). If the syntaxer module 116 determines that there are no errors in the incoming query, the syntaxer module 118 converts the received query into a parse tree (not shown) and transmits the parse tree as an input parameter to the resolver module 118. The parse tree includes nodes that represent the received query as entered by the user. If the syntaxer module 116 determines that there is a grammatical error in the received query (e.g., improper syntax), the syntaxer module 116 returns a syntax error message to the requesting system 102, 106 via respective network communication module 112 or host channel adapter 114. The resolver module 120 resolves or converts database, table, view, or macro names of symbolic operations in the received parse tree to numeric identifiers, determines data types and sizes of all parameters and columns (e.g., integer; 4 bytes) involved in the symbolic operations, and then transmits the resolved parse tree (not shown) as an input parameter to the optimizer module 120.

Now with particular reference to the optimizer module 120 of FIG. 1, the optimizer module 120 determines an optimized plan, e.g., a least expensive plan in terms of resources (e.g., usage of AMPs 138, 150, access to storage devices 164, 172, 176 and 184, intermediate files and the like), to answer the received query and optimizes the resolved parse tree into an optimized plan tree (not shown) that reflects the determined plan. More specifically, the optimized plan tree includes a set of individual statement trees, where each individual statement tree corresponds to a particular AMP processing step to be executed by one or more of AMP 138, 150. That is, the individual statement tree may include a flag node that indicates whether the corresponding AMP processing step is to be distributed to all AMPs 138, 150, a single AMP, or a subset of the AMPs 138, 150 in the DBMS system 108. Furthermore, each statement tree includes plural sub-trees, which represent one or more source tables involved in an AMP processing step and a sub-tree representing an intermediate or a final result file that is to be produced by the AMP processing step. Thus, a sub-tree that represents a source table is referred to as source sub-tree and a sub-tree that represents an intermediate file or a final result file is referred to as sink sub-tree.

Further with reference to the optimizer module 120 of FIG. 1, the optimizer module 120 includes a fast access determination module 121 and a fast access node insertion module 122. In determining the optimized plan (e.g., optimized plan tree), the fast access determination module 121 determines whether the plan would benefit from having one or more intermediate files identified in the resolved parse tree (e.g., via sink sub-trees) be stored in fast access storage 172, 184. The fast access determination module 121 makes this determination based on the following fast-access-related (FAR) information: 1) table statistics, which enable estimation of a number of rows in the one or more intermediate files, collected by the DBMS 108 and stored in dictionary tables; 2) data type and size information supplied from the resolver module 118 regarding the size of the data columns involved in the query, which enable estimation of size of a row in the one or more intermediate files; and 3) performance metrics associated with normal storage devices 164, 176 and fast-access storage devices 172, 184, which enable comparison of benefit of storing the one or more intermediate files in fast-access storage devices 172, 184 versus storing the one or more intermediate files in the normal storage devices 164, 176. The performance metrics are typically generated/calculated during initialization/configuration of the DBMS 108 and are dynamically updated, as necessary, as additional storage devices are attached to the DBMS 108. The calculated performance metrics are maintained in storage device metrics 124 as normal storage device performance statistics 126 and fast access storage device performance statistics 128, which are accessible by the optimizer module 120.

Yet further with particular reference to the optimizer module 120 of FIG. 1, based on the foregoing information (e.g., table statistics, data type and size, and cost metrics), the fast access determination module 121 may determine whether the plan would benefit from having the one or more intermediate files identified in the resolved parse tree (e.g., via sink sub-trees) be stored in fast access storage 172, 184. If the fast access determination module 121 determines that there is a benefit to storing the one or more intermediate files in fast access storage 172, 184, the fast access node insertion module 122 inserts a fast access node into the corresponding sink sub-trees representing the one or more intermediate files. However, if it is determined that there is no benefit to storing the one or more intermediate files in fast access storage 172, 184, a fast access node is not inserted into the sink sub-tree. After optimization, the optimizer module 120 transmits the optimized plan tree as an input parameter to the step generator module 130.

Now with particular reference to the step generator module 130 of FIG. 1, the step generator module 130 generates one or more steps from the optimized plan tree, e.g., transforming each statement tree within the optimized plan tree into a corresponding concrete AMP processing step (not shown) that is to be executed by the AMPs 138, 150 to process the input query from requesting systems 102, 106. Each concrete AMP processing step may be a transmittable message that encapsulates all of the pertinent information (e.g., context) extracted from an associated statement tree as parameters in the message. Thus, the concrete AMP processing step will include the context for each of the involved source tables (e.g., source context), as well as the context for each of the one or more intermediate files or the result file (e.g., sink context). The step generator module 130 includes a fast access node determination module 132 that determines whether a particular sink sub-tree in the optimized plan tree includes a fast access node. Thus, if the fast access node determination module 132 determines that there is a fast access node in the sink sub-tree representing an intermediate file, the step generator module 130 will set a fast access storage flag (not shown) in the sink context (e.g., fast access flag parameter) of the concrete AMP processing step to indicate that an intermediate file is to be written to a fast access storage device 172, 184, as will be described in greater detail below. The step generator module 130 transmits the one or more concrete AMP steps to the dispatcher module 134 for dispatch to the appropriate AMPs 138, 150 for execution.

Now with particular reference to the dispatcher module 134 of FIG. 1, the dispatcher 134 examines the context of each concrete AMP processing step (e.g. message) received from the step generator module 130 to determine whether the concrete AMP processing step is to be distributed to all AMPs 138, 150, a single AMP, or a subset of AMPs within the DBMS 108. As described previously, a flag node may have been included in a statement tree that indicates whether the corresponding concrete AMP processing step is to be distributed to all AMPs 138, 150, a single AMP or a subset of the AMPs 138, 150 in the DBMS system 108. Based on the determination, the dispatcher module 134 dispatches the received one or more concrete AMP processing steps to the appropriate AMPs 138, 150 via the interconnect network 136 and awaits for responses from the respective AMPs 138, 150. That is, the dispatcher module 134 dispatches or transmits the individual concrete AMP processing steps that represent the received query to AMPs 138, 150 of the DBMS 108 for processing/execution. More specifically, the dispatcher module 134 may place the concrete AMP processing steps, one at a time, on the interconnect network 136 until all the concrete AMP processing steps associated with the received request are have been dispatched. The dispatcher module 134 further awaits completion responses for the concrete AMP processing steps from AMPs 138, 150, and joins the returned results from the AMPs 138, 150 into a query result. The dispatcher module 134 returns the query result (e.g., rows of the distributed database from distributed mass storage 162; storage devices 164, 176) to the requesting system 104, 106.

Now with particular reference to the AMPs 138, 150 of FIG. 1, it should be noted that the DBMS 108 may include any number of parallel processing AMPs as may be desired. However, for clarity and conciseness of the description, only two AMPs 138, 150 are illustrated. Each AMP 138, 150 may be virtual processor that receives concrete AMP processing steps via interconnect network 136 from parsing engine (PE) 112 and performs database functions to retrieve or update data in the database stored across disparate storage devices 164, 176 of the distributed mass storage 162. The database functions, among others, may include inserts, deletes, or modifies of contents of tables in the distributed database. When requested to perform a database operation by a concrete AMP processing step, an AMP 138, 150 performs that database operation against its own localized portion of the distributed database in a respective storage device 164, 176, as will be described in an example hereinafter. Not only is each AMP 138, 150 associated with a respective mass storage device 164, 176, but each AMP 138, 150 is also associated with a respective fast access storage device 172, 184, as will be described in greater in the example hereinafter. Thus, each AMP 138, 150 manages its own storage devices of the distributed mass storage 162. More specifically, AMP 138 manages storage device 164 and fast access storage device 172, while AMP 150 manages storage device 176 and fast access storage device 184.

Further with reference to AMPs 138, 150 of FIG. 1, AMP 138 includes a step processing module 140, a file system 142 and a file system cache 148, and AMP 150 includes a step processing module 152, a file system 154 and a file system cache 160. The file system 142 of AMP 138 includes a normal storage pool 144 and a fast access storage pool 146 of available or unallocated (free) storage blocks in respective storage devices 164, 172, while file system 154 of AMP 150 includes a normal storage pool 156 and a fast access storage pool 158 of available or unallocated (free) storage data blocks in respective storage devices 176, 184. In this regard, file system 142 manages access (read/write) to storage device 164 and fast access storage device 172 of distributed mass storage 162, while file system 154 manages access to storage device 176 and fast access storage device 184. Moreover, file system 142 of AMP 138 allocates one or more free data blocks from respective storage pools 144, 146 to write data to respective storage devices 164, 172, and file system 154 of AMP 150 allocates one or more free data blocks from respective storage pools 156, 158 to write data to respective storage devices 176, 184. In addition, file systems 142, 154 also manage access to their respective file system caches 148, 160. Although for clarity purposes FIG. 1 illustrates file system 142 of AMP 138 accessing the file system cache 148 separately or indirectly from accessing storage device 164, 172, in operation file system 142 accesses the storage device 164, 172 via cache 148, which may fully hold data to be written or read (e.g., intermediate file), or may temporarily buffer data to be written to or read from storage device 164, 172. Similarly, file system 154 of AMP 150 accesses (read/writes) its storage devices 176, 184 via file system cache 160.

Now with particular reference to distributed mass storage 162 of FIG. 1, the distributed mass storage 162 includes plural conventional storage devices 164, 176 (e.g., disk drives, optical drives and the like) and fast access storage devices 172, 184 (solid state storage, memory storage, and the like). Fast access storage devices 172, 184 have faster access (e.g., read/write speeds) than the respective conventional mass storage devices 164, 176. The following illustrates one example of the contents of the distributed mass storage 162. Thus, for example, a database (not shown) may include two example tables (e.g., T$_{BL}$1 and T$_{BL}$2), each having one thousand (1000) rows. DBMS 108 (e.g., Teradata by NCR Corp.) may employ a specialized distribution routine (e.g., hash routine) to determine an even distribution of rows of a table of the database across storage devices 164, 176. Each table in the database may have an associated prime index consisting of one or more columns of the table, the prime index being declared at the time the table was created. The prime index value of each row in the table is passed into the hash routine, the result of which can be used to map the row to one of the AMPs 138, 150 configured in the DBMS 108. A key requirement for the hash routine is that if the value of column A is equal to the value of column B, then it must also be true that the hash (column A) is equal to the hash (column B). This ensures that rows that have equal prime index values will always be distributed to the same AMP 138, 150. Thus, the goal of the hash routine is to distribute the rows of the table in as even a manner as possible.

Further with reference to the distributed mass storage 162, for the purpose of the foregoing example (e.g., TBL1 and TBL2 each having 1000 rows) a perfect distribution is assumed. It is reiterated that a variety of distribution schemes may be employed, resulting in different distributions of the foregoing tables. Thus, the database may be distributed in the assumed manner amongst mass storage device 164 and 176 as follows. For example, mass storage device 164 includes TBL1' 166, which includes exactly one half of the distributed database's thousand rows of TBL1 (e.g., five hundred rows), and storage device 176 includes TBL1' 178, which includes the other half of the distributed database's thousand rows of TBL1 (e.g., five hundred rows). Therefore, TBL1 is represented by TBL1' 166 and TBL1' 178. Similarly, for example, mass storage device 164 includes TBL2' 168, which includes half of the distributed database's thousand rows of TBL2 (e.g., five hundred rows), and storage device 176 includes TBL2' 180, which includes the other half of the distributed database's thousand rows of TBL2 (e.g., five hundred rows). Therefore, TBL2 is represented by TBL2' 168 and TBL2' 180. It is reiterated that the illustrated distributions of TBL1 and TBL2 are examples of the distributions that are accessible by respective AMPs 138, 150. Additional mass storage devices (e.g., similar to storage device 164, 176) and respective AMPs (e.g., similar to AMPs 138, 150) may be provided, facilitating different distributions of the database across the mass storage devices and access thereto via the respective AMPs.

Now with reference to the operation of DMBS 108, the following example SQL query will illustrate the inventive fast access storage in accordance with the foregoing example distribution of the database (e.g., distribution of TBL1 and TBL2) amongst mass storage devices 164, 176 of FIG. 1. For example, to resolve the following query, "SELECT*FROM TBL1, TBL2 WHERE TBL1.$a$=TBL2.$b$," which selects all rows from both tables TBL1 and TBL2 in which TBL1.$a$=TBL2.$b$, it will be necessary for the DBMS 108 to redistribute parts of the table TBL1, or TBL2, or both before each of the AMPs 138, 150 may perform a join operation "TBL1.$a$=TBL2.$b$" that resolves the query. More specifically, as part of determining the optimized plan, the optimizer module 120 of the parsing engine 110 may choose to redistribute TBL1 and TBL2 by making a complete copy of one of the tables (e.g., 1000 rows of TBL1 or TBL2) on each of the storage devices 164, 176, or, alternatively, the optimizer module 120 may choose to copy only certain rows of both tables (e.g., TBL1 and TBL2) based on their join columns (e.g., column TBL1.$a$ and TBL2.$b$) the respective storage devices 164, 176. Regardless of the chosen strategy, the redistributed rows will be deposited into intermediate files 174, 188 of respective fast access storage devices 172, 184. The optimizer module 120 may record its decision within the optimized plan tree by inserting one (copy operation) or two (copy operations) statement trees into the optimized plan tree to perform the corresponding pre-join redistribution. For the purposes of foregoing example, it is assumed that the optimizer module 120 has chosen to redistribute TBL2 by making a complete copy of TBL2 to intermediate files 174, 186 of respective fast access storage devices 172, 184. Thus the optimizer module 120 will insert a single statement tree into the optimized plan tree, with TBL2' being the source sub-tree and intermediate files 174 and 186 being the sink sub-trees for that statement tree. It is further assumed that based on the fast-access-related (FAR) information, the optimizer module 120 has chosen that the intermediate files be created in and copied to respective fast access storage devices 172, 184.

Further with reference to the operation of DBMS 108, to accomplish the foregoing copy operation, the optimizer module 120 sets a flag node in the optimized plan tree to indicate "all AMPs," such that the dispatcher module 134 transmits the AMP processing step to all of the AMPs 138, 150 within the DBMS 108. Therefore, when AMP 138 receives the AMP processing step (e.g., copy operation), the execution of the copy operation by the step processing module 140 will result in TBL2' 168 being read from mass storage device 164. Similarly, when AMP 150 receives the AMP processing step (e.g., copy operation), the execution of the copy operation by the step processing module 152 will result in TBL2' 180 being read from mass storage device 176. Thereafter, the AMPs 138, 150 will spawn respective AMP redistribution steps, which will include the data (e.g., rows) read from respective tables TBL2' 168, TBL2' 180, and which will be transmitted to all AMPs (e.g., AMPs 138, 150) instructing the AMPs 138, 150 to copy the data in the AMP redistribution step to their local intermediate files 174, 186. It is to be noted that the spawned AMP redistribution step will also have the fast-access flag turned set, as indicated by the sink context portion of the AMP processing step originally received by AMP 138. The processing of the spawned AMP redistribution steps to perform the copy operation will be described with reference to AMP 138 only, as AMP 150 performs similar processing as that described with reference to AMP 138. Therefore, upon receiving and executing multiple spawned AMP redistribution steps (e.g., from AMPs 138, 150), the step processing module 140 of AMP 138 determines whether the fast-access flag is set in the spawned AMP redistribution step, and if so, the step processing module 140 requests the file system 142 to write the data (rows) associated with the multiple spawned AMP redistribution steps to its intermediate file 174 residing on the fast access storage device 172. As noted hereinbefore, TBL2' 180 may be redistributed similarly via multiple spawned AMP redistribution steps processed by AMP 150 (e.g., from AMPs 138, 150).

Still further with reference to the operation of DBMS 108, after example redistribution described above, AMPs 138, 150 may perform via one or more AMP processing steps the join operation "TBL1.$a$=TBL2.$b$," as the first or second part of TBL1 (e.g., TBL1' 166) may be joined to the entire TBL2 (e.g., TBL2' 168 and TBL2' 180 now stored in intermediate file 174) and the other part of TBL1 (e.g., TBL1' 178) may be joined to the entire TBL2 (e.g., TBL2' 180 and TBL2' 168 now stored in intermediate file 186). The resultant file (e.g., table) 170 including TBL1' 166 joined with TBL2' 168 and TBL2' 180 of intermediate file 174 is stored in mass storage device 164, while resultant file (e.g., table) 182 including TBL1' 178 joined with TBL2' 180 and TBL2' 168 of intermediate file 186 is stored in mass storage device 176. Upon execution of all steps, the step processing module 140, 152 of each respective AMP 138, 150 transmits via interconnect network 136 its respective result file 170, 182 to the dispatcher module 134, which combines or joins the result files 170, 182 and returns the combined result file to the requesting system 102, 106 in response to the query.

Figure 2A:
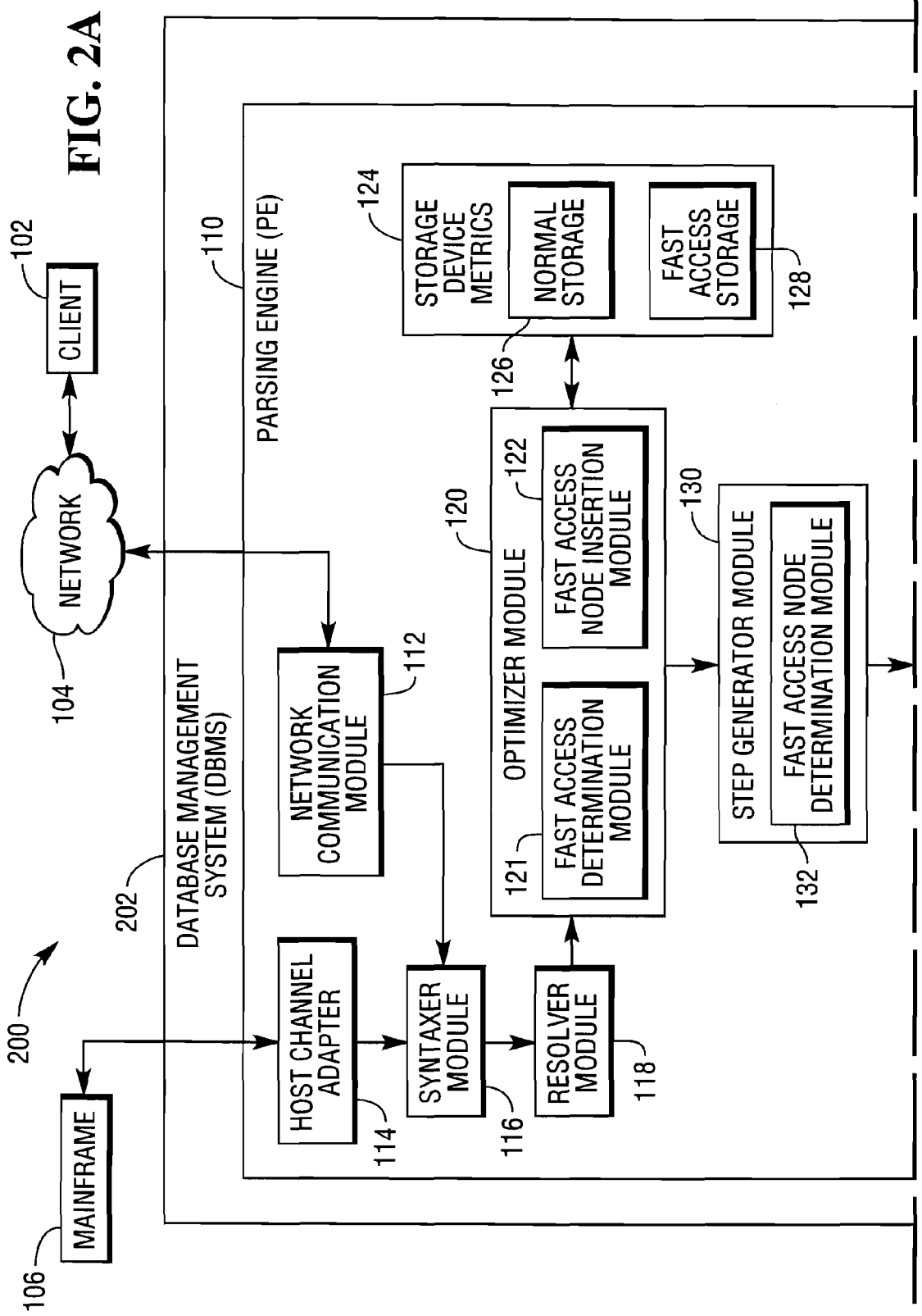
FIG. 2 is example query system including another example parallel processing database management system (DBMS) that provides fast access storage regions for one or more intermediate files associated with the execution of a query from one or more requesting systems.
Figure 2B:
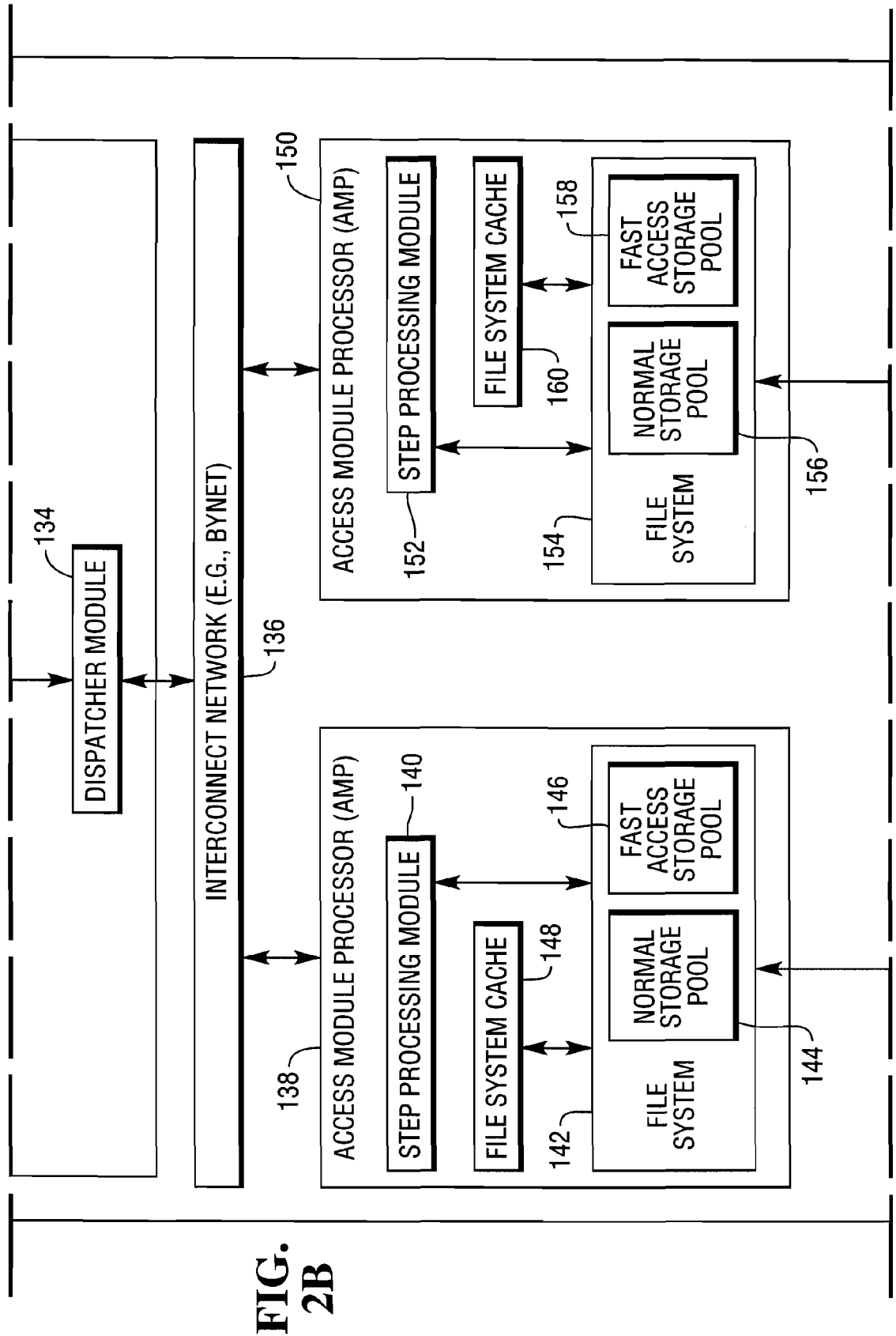

FIG. 2 is an example query system 200 including an example parallel processing database management system (DBMS) 202 that provides fast access storage regions 218, 2224 for one or more intermediate files 174, 186 associated with the execution of a query or a request from one or more requesting systems 102, 106. Similarly to the example DMBS 108 illustrated in FIG. 1, the DMBS 202 of FIG. 2 includes the parsing engine (PE) 110, the interconnect network 136, and one or more access module processors (AMPs) 138, 150, all of which were described by way of example with reference to FIG. 1. The file system 142 of AMP 138 includes a normal storage pool 204 and a fast access storage pool 206 of available or unallocated (free) storage blocks in respective storage regions 216, 218 of storage device 214, while file system 154 of AMP 150 includes a normal storage pool 208 and a fast access storage pool 210 of available or unallocated (free) storage data blocks in respective storage regions 222, 224 of storage device 220. In this regard, file system 142 manages access (read/write) to regular access storage region 216 and fast access storage region 218 of storage device 214, while file system 154 manages access to regular access storage region 222 and fast access storage region 224 of storage device 220. File system 142 of AMP 138 allocates one or more free data blocks from respective storage pools 204, 206 to write data to respective storage regions 216, 218, and file system 154 of AMP 150 allocates one or more free data blocks from respective storage pools 208, 210 to write data to respective storage regions 222, 224.

Further with reference to FIG. 2, in contrast to the distributed mass storage 162 of FIG. 1, the distributed mass storage 212 includes plural conventional storage devices 214, 220 (e.g., disk drives, optical drives and the like) each of which includes regular access storage regions 216, 222 and fast access storage regions 218, 224. The respective fast access storage regions 218, 224 have faster access (e.g., read/write speeds) than the regular access storage regions 216, 222. More specifically, fast access storage pools 206, 210 include fast access data blocks harvested from the existing conventional storage device 214, 220, while normal storage pools 204, 2208 include normal data blocks from the existing conventional storage device 214, 220. The conventional storage devices 214, 220 may be viewed as a collection of disk platters that are divided into concentric cylinders. Data blocks of cylinders that reside on outer rings or tracks perform at access levels (read/write) that are significantly better than data blocks of other cylinders that reside on inner rings or tracks of the conventional storage devices 214, 220. Thus, data blocks of outer cylinders of conventional storage devices 214, 220 are harvested and stored in the respective fast access storage pools 206, 210, while data blocks of other inner cylinders are stored in the normal storage pools 204, 208.

Yet further with reference to FIG. 2, the processing of AMP steps from the dispatcher 134 and spawned AMP redistribution steps from AMPs 138, 150 was described by way of example in reference to FIG. 1, and this processing is performed similarly with reference to example DBMS 202 of FIG. 2, except that fast access regions on conventional storage devices instead of separate fast access storage devices are utilized for storing intermediate files.

Figure 3:
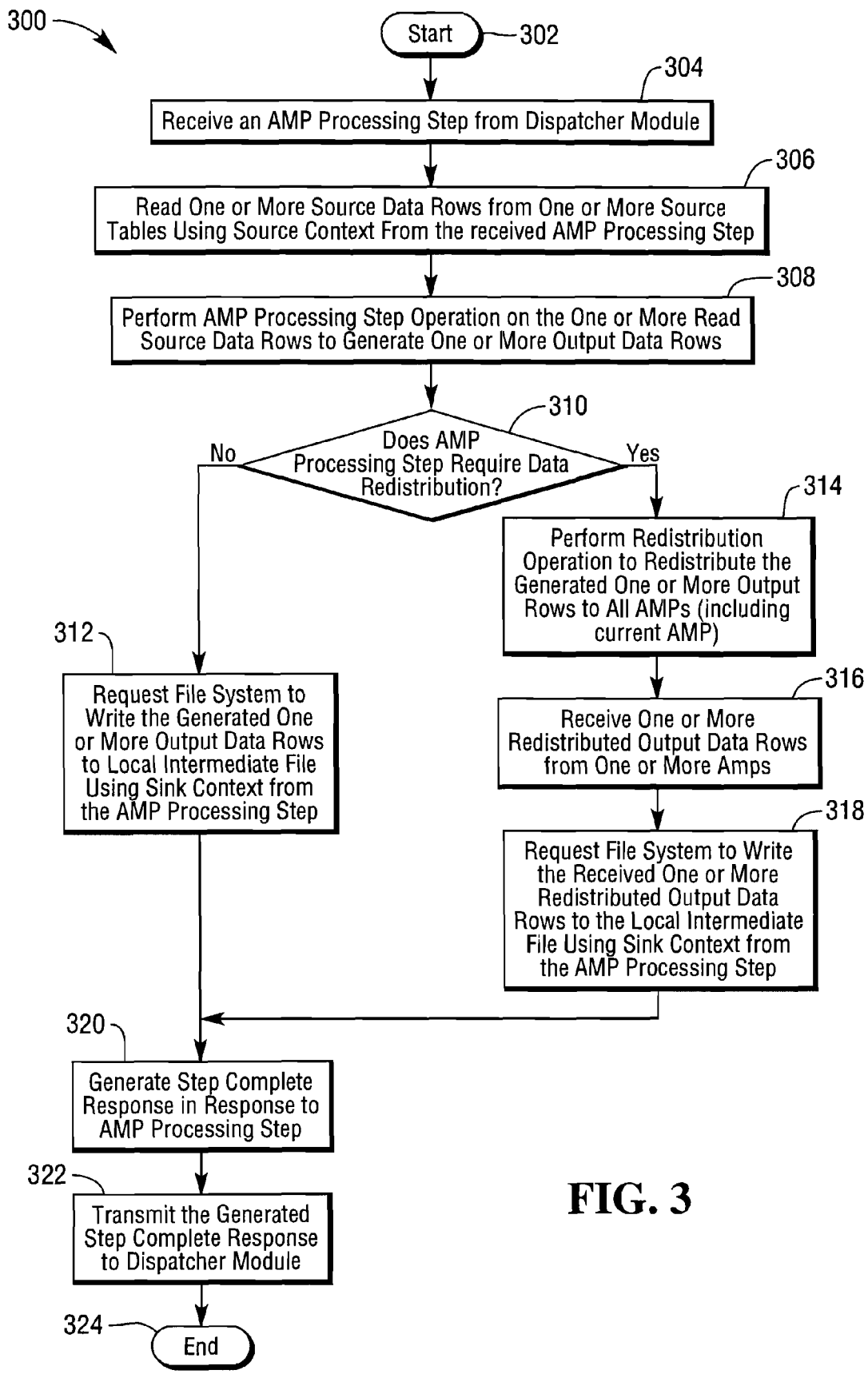
FIG. 3 is a flowchart that illustrates an example method performed by a step processing module of an access module processor (AMP) to optimize storage allocation in accordance with example database management systems of FIGS. 1 and 2.

FIG. 3 is a flowchart that illustrates an example method 300 performed by step processing modules 140, 152 of AMPs 138, 150 to optimize storage allocation in accordance with example database management systems 108, 202 of FIGS. 1 and 2. Method 200 will be described in detail relating to processing performed by AMP 138. It should be noted that this method is similarly applicable in relation to AMP 150. Furthermore, the example illustrated in FIG. 1, requiring example redistribution of T$_{BL}$2' 168, 180, is used herein to illustrate the example method 300 of FIG. 3. Thus, the method starts at operation 302. At operation 304, the step processing module 140 receives an AMP processing step from dispatcher module 134 including a redistribution operation to retrieve T$_{BL}$2' 168, 180 and redistribute T$_{BL}$2' 168, 180 to intermediate file 174. At operation 306, the step processing module 140 reads one or more source data rows from one or more source tables (e.g., T$_{BL}$2' 168) using a source context from the received AMP processing step. At operation 308, the step processing module 140 performs an AMP processing step operation on the one or more read source data rows to generate one or more output data rows. The AMP processing step operation may be for example: a select all rows operation (e.g., SELECT*FROM TABLE T1), in which all rows are retrieved from the source table; a predicated select operation (e.g., SELECT FROM TABLE T1 WHERE T1.city='Washington', in which rows are retrieved from the source table and then filtered by the where-clause predicate; a join operation, in which a row is retrieved from each of plural source tables, and then joined to produce a single joined result row; or any other form of operation (e.g., ANSI SQL operation).

Further with reference to FIG. 3, at operation 310 the step processing module 140 determines whether the AMP processing step requires data redistribution. If it determined that redistribution is not required at operation 310, the step processing module 140 requests the file system 142 to write the generated one or more output data rows to the local intermediate file 174 using the sink context from the AMP processing step at operation 312. Alternatively, if at operation 310 redistribution is determined to be required, the method 300 continues at operation 314 where the step processing module performs the redistribution operation to redistribute the generated one or more output rows to all AMPs 138, 150, including the current AMP 138. The redistribution may be performed for example by AMP 138 spawning and transmitting an AMP redistribution processing step to AMPs 138, 150. At operation, 316 the step processing module receives one or more redistributed output data rows (e.g., rows of T$_{BL}$2' 168, 180) from one or more AMPs 138, 150. At operation 318, the step processing module 140 requests the file system 142 to write the one or more redistributed output data rows (e.g., redistributed rows of T$_{BL}$2' 168, 180) to the local intermediate file 174 using the sink context from the AMP processing step. After operation 312 and 318, the method 300 continues at operation 312 where the step processing module 140 generates a step complete response (indicating completion) in response to the AMP processing step received in operation 304. The step processing module 140 transmits the generated step complete response to the dispatcher module 134 at operation 322. The method 300 ends at operation 324.

Figure 4:
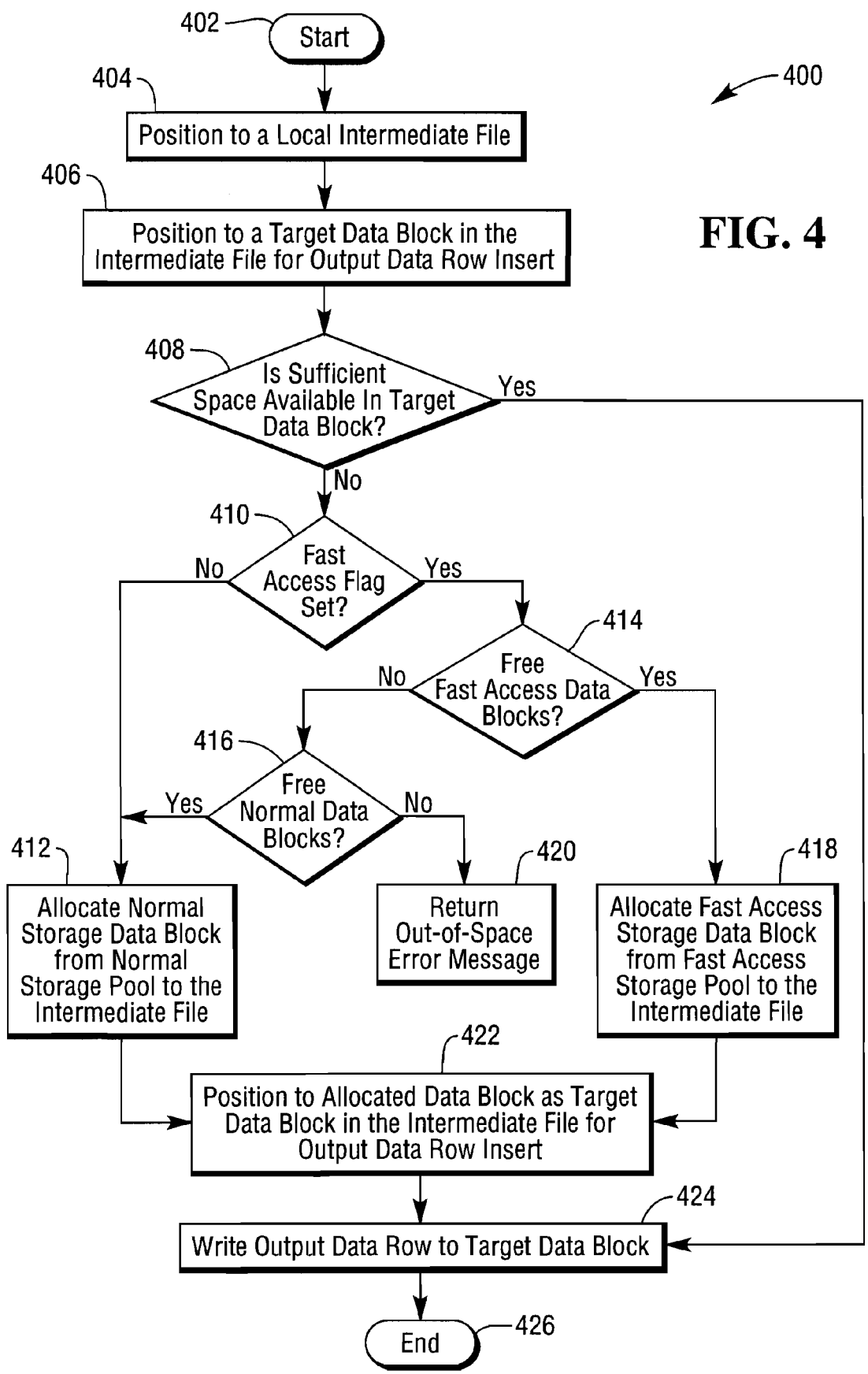
FIG. 4 is a flowchart that illustrates an example method performed by a file system of an AMP to optimize storage allocation in accordance with example database management systems of FIGS. 1 and 2.

FIG. 4 is a flowchart that illustrates an example method 400 performed by file system 142, 154 of AMPs 138, 150 to optimize storage allocation in accordance with example database management systems 108, 202 of FIGS. 1 and 2. Method 400 will be described in detail relating to processing performed by file system 142 of AMP 138 to write data rows to intermediate file 174 that are redistributed from T$_{BL}$2' 168, 180. It should be noted that this method is similarly applicable in relation to AMP file system 154 of 150. The method starts at operation 402 in which file system 142 receives a request from step processing module 140 to write an output data row to intermediate file 174 (located either in fast access storage device 172 of FIG. 1 or in fast access storage region 218 of storage device 214 of FIG. 2). At operation 404, the file system 142 positions to the intermediate file 174. This may be accomplished by obtaining a file ID for the intermediate file 174. At operation 406, the file system 142 positions to a target block in the intermediate file for output data row insert. At operation 408, the file system 142 determines whether there is sufficient space available in the target data block. If there is sufficient space in the target data block to insert the output data row, the method 400 continues at operation 424 where the file system 142 writes or inserts the output data row to the target data block. Alternatively, if the file system 142 determines there is insufficient space available in the target data block at operation 408, the method continues at operation 410 where the file system 142 determines whether the fast access flag is set in the sink context of the AMP processing step.

Further with reference to FIG. 4, if at operation 410 it is determined that fast access flag is set in the sink context of the AMP processing step, then the method 400 continues at operation 414 where the file system 142 determines from the fast access storage pool 146, 206 whether there is a free fast access data block available. If a fast access data block is available, then at operation 418 the file system 142 allocates a fast access storage data block from fast access storage 146, 206 to the intermediate file 174. If a fast access data block is unavailable, then at operation 416 the file system 142 determines whether from the normal access storage pool 144, 204 whether there is a free normal data block available. If at operation 416 it is determined that a normal block is unavailable, the file system 142 returns an out-of-space error message to the step processing module 142. Alternatively, if at operation 416 it is determined that a normal block is available or a fast access flag is not set at operation 410, then at operation 412 a normal storage data block from the normal storage pool 144, 204 is allocated to the intermediate file 174. From either operation 412 or 418, the method 400 continues at operation 422 where the file system 142 positions to the allocated data block as the target data block in the intermediate file 174 for output row insert. Thereafter, at operation 424 the file system 142 writes the output data row to the target data block. The method ends at operation 426.

Figure 5:
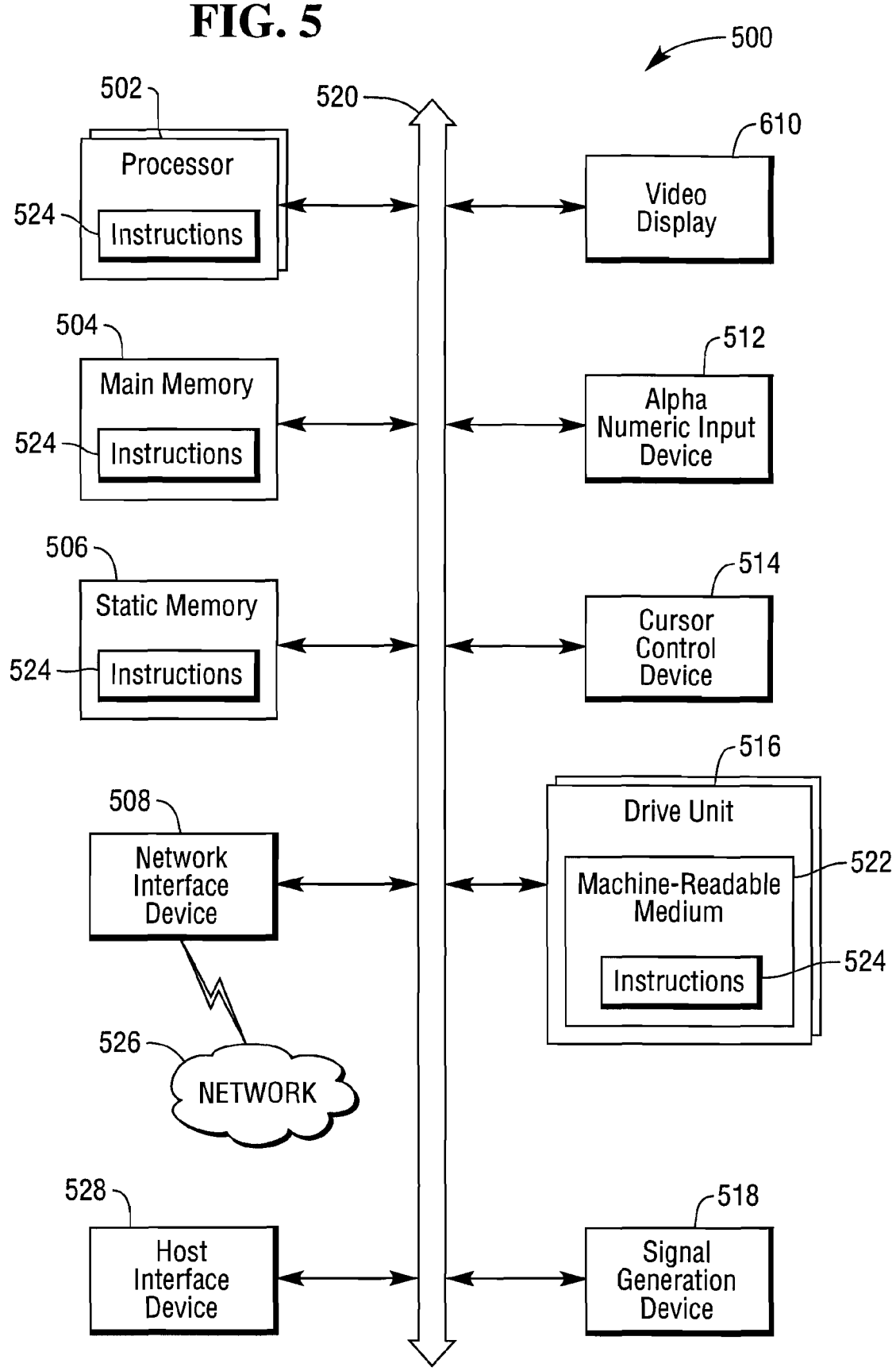

FIG. 5 is a diagrammatic representation of machine in an example form of a computer system within which a set of instructions, for causing the machine to perform any one or more of the methodologies discussed herein in FIGS. 1-4, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 5, the example computer system 500 includes one or more processor 502 (e.g., central processing units (CPUs), a graphics processing unit (GPU) or both), a main memory 504 and a static memory 506, which communicate with each other via a bus 520. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), one or more disk drive units 516, a signal generation device 518 (e.g., a speaker), a network interface device 508, and host interface device 528.

Still further with reference to FIG. 5, one or more of the disk drive units 516 includes machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the one or more processors 502 during execution thereof by the computer system 500, the main memory 504 and the one or more processors 502 also constituting machine-readable media. The software 524 may further be transmitted or received over a network 526 via the network interface device 508 utilizing any one of a number of well-known transfer protocols (e.g., HTTP).

Lastly with reference to FIG. 5, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, and optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for optimizing storage allocation in a database management system have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method to optimize storage allocation in a database management system, the method comprising:
    receiving a processing step at a step processing module of an access module processor from a dispatcher module, the processing step is a message that encapsulates context extracted from a statement tree for the access module processor as parameters in the message;
    determining whether a fast access storage flag is set in the processing step, the fast access storage flag indicating use of an intermediate file in fast access storage to store one or more redistributed data rows of a table of a database that is distributed across one or more storage devices of the database management system, the fast access storage selected from outer cylinders of the one or more storage devices and providing faster access than inner cylinders of the one or more storage devices of the database management system, the fast access storage flag set based on the presence of a fast access node in a sink sub tree of a resolved parse tree for the processing step and the fast access node inserted into the sink sub tree based evaluation of table statistics for the database management system, a data type and size information associated with the processing step, and cost metrics for storage devices of the database management system, and instructing other access module processors to copy the one or more redistributed data rows to their local intermediate files;
    selectively allocating a free fast access storage data block to the intermediate file from a fast access storage pool based on the determination that the fast access storage flag is set;
    determining whether the free fast access storage data block is available in the fast access storage pool to be allocated to the intermediate file;
    determining whether a free normal storage data block is available in normal storage pool to be allocated to the intermediate based on the determination that no free fast access storage data block is available;
    selectively allocating a free normal storage data block to the intermediate file from a normal storage pool based on the determination that a free normal storage data block is available and allocating as an allocated free normal storage data block; and
    writing the redistributed data row from the one or more redistributed data rows to the allocated free normal storage data block when the free normal storage block is available;
    writing a redistributed data row from the one or more redistributed data rows to the allocated fast access storage data block when the free normal storage block is unavailable; and
    joining result files in a combined result file and returning the combined result file to a requesting system.

2. The method to optimize storage allocation of claim 1, wherein the method further comprises:
    selectively allocating a normal storage data block to the intermediate file from a normal storage pool based on the determination that the fast access storage flag is not set; and
    writing the redistributed data row from the one or more redistributed data rows to the allocated fast access storage data block.

3. The method to optimize storage allocation of claim 1, wherein the method further comprises:
    reading one or more data rows from a storage device of the one or more storage devices using a source context from the processing step, the source context identifying the one or more data rows on the storage device; and
    generating one or more data rows from the one or more data rows read from the storage device based on an operation in the source context of the processing step.

4. The method to optimize storage allocation of claim 3, wherein the method further comprises:
    determining whether the processing step requires redistribution of the generated one or more data rows;
    redistributing the generated one or more data rows from the access module processor to a plurality of access module processors including the access module processor, each of the plurality of access module processors redistributing its own generated one or more data rows from an associated storage device; and
    receiving the one or more redistributed data rows from the plurality of the access module processors at the access module processor.

5. The method to optimize storage allocation of claim 1, wherein the method further comprises:
    converting a query against the database received from a requesting system into a parse tree including a plurality of nodes;
    resolving the parse tree into a resolved parse tree associating one or more of the plurality of nodes with numeric identification data;
    determining an optimized plan tree from the resolved parse tree, the optimized plan tree including a source sub-tree that represents the table and a sink sub-tree that represents the intermediate file;
    determining whether the intermediate file is to be stored in fast access storage using fast access related information;
    inserting a fast access storage node to the sink sub-tree based on the determination that the intermediate file is to be stored in fast access storage;
    generating the processing step from the optimized plan tree; and
    dispatching the processing step to a plurality of access module processors including the access module processor.

6. The method to optimize storage allocation of claim 5, wherein the method further comprises:
    determining the table is to be redistributed from the one or more storage devices; and
    inserting a redistribution node to the sink sub-tree based on the determination that the table is to be redistributed.

7. A database management system to optimize storage allocation, the database management system comprising:
    an access module processor as part of a processor for a parallel processing system and the access module processor executing on the processor and comprising:

a step processing module to receive a processing step from a dispatcher module, the processing step is a message that encapsulates context extracted from a statement tree for the access module processor as parameters in the message; and a file system including a fast access storage pool storing a free fast access storage data block selected from outer cylinders of one or more storage devices, the file system to:

determine whether a fast access storage flag is set in the processing step, the fast access storage flag indicating use of an intermediate file in fast access storage to store one or more redistributed data rows of a table of a database that is distributed across the one or more storage devices of the database management system and the fast access storage flag set based on the presence of a fast access node in a sink sub tree of a resolved parse tree for the processing step and the fast access node inserted into the sink sub tree based evaluation of table statistics for the database, a data type and size information associated with the processing step, and cost metrics for storage devices of the database, and instructing other access storage modules to copy the one or more redistributed data rows of the table of the database to their local intermediate files;

selectively allocate a free fast access storage data block to the intermediate file from a fast access storage pool based on the determination that the fast access storage flag is set;

determining whether the free fast access storage data block is available in the fast access storage pool to be allocated to the intermediate file;

determining whether a free normal storage data block is available in normal storage pool to be allocated to the intermediate based on the determination that no free fast access storage data block is available;

selectively allocating a free normal storage data block to the intermediate file from a normal storage pool based on the determination that a free normal storage data block is available and allocating as an allocated free normal storage data block; and writing the redistributed data row from the one or more redistributed data rows to the allocated free normal storage data block when the free normal storage block is available write a redistributed data row from the one or more redistributed data rows to the allocated fast access storage data block when the free normal storage block is unavailable; and joining result files in a combined result file and returning the combined result file to a requesting system.

8. The database management system of claim 7, wherein the file system is further to:

selectively allocate a normal storage data block to the intermediate file from a normal storage pool based on the determination that the fast access storage flag is not set; and write the redistributed data row from the one or more redistributed data rows to the allocated fast access storage data block.

9. The database management system of claim 7, wherein the step processing module is further to:

read one or more data rows from a storage device of the one or more storage devices using a source context from the processing step, the source context identifying the one or more data rows on the storage device; and generate one or more data rows from the one or more data rows read from the storage device based on an operation in the source context of the processing step.

10. The database management system of claim 9, wherein the step processing module is further to:

determine whether the processing step requires redistribution of the generated one or more data rows;

redistribute the generated one or more data rows from the access module processor to a plurality of access module processors including the access module processor, each of the plurality of access module processors redistributing its own generated one or more data rows from an associated storage device; and receive the one or more redistributed data rows from the plurality of the access module processors at the access module processor.

11. The database management system of claim 7, wherein database management system further comprises:

a parsing engine comprising:

a syntaxer module to convert a query against the database received from a requesting system into a parse tree including a plurality of nodes;

a resolver module to resolve the parse tree into a resolved parse tree associating one or more of the plurality of nodes with numeric identification data;

an optimizer to determine an optimized plan tree from the resolved parse tree, the optimized plan tree including a source sub-tree that represents the table and the sink sub-tree that represents the intermediate file;

a fast access determination module to determine whether the intermediate file is to be stored in fast access storage using fast access related information;

a fast access node insertion module to insert the fast access storage node to the sink sub-tree based on the determination that the intermediate file is to be stored in fast access storage;

a step generator module to generate the processing step from the optimized plan tree; and a dispatcher module to dispatch the processing step to a plurality of access module processors including the access module processor.

12. The database management system of claim 11, wherein the optimizer is further to:

determine the table is to be redistributed from the one or more storage devices; and insert a redistribution node to the sink sub-tree based on the determination that the table is to be redistributed.

13. A machine-readable medium including instructions executable by the machine for optimizing storage allocation in a database management system, the instructions causing the machine to:

receive, by the machine, a processing step at a step processing module of an access module processor from a dispatcher module, the processing step is a message that encapsulates context extracted from a statement tree for the access module processor as parameters in the message;

determine, by the machine, whether a fast access storage flag is set in the processing step, the fast access storage flag indicating use of an intermediate file in fast access storage selected from outer cylinders of one or more storage devices and to store one or more redistributed data rows of a table of a database that is distributed across the one or more storage devices of the database management system;

selectively allocate, by the machine, a free fast access storage data block to the intermediate file from a fast access storage pool based on the determination that the fast access storage flag is set system and the fast access storage flag set based on the presence of a fast access node in a sink sub tree of a resolved parse tree for the processing step and the fast access node inserted into the sink sub tree based evaluation of table statistics for the database, a data type and size information associated with the processing step, and cost metrics for storage devices of the database, and instructing other access module processors to store the one or more redistributed data rows of the table for the database to their local intermediate files;

determine whether the free fast access storage data block is available in the fast access storage pool to be allocated to the intermediate file;

determine whether a free normal storage data block is available in normal storage pool to be allocated to the intermediate based on the determination that no free fast access storage data block is available;

selectively allocate a free normal storage data block to the intermediate file from a normal storage pool based on the determination that a free normal storage data block is available and allocating as an allocated free normal storage data block; and write the redistributed data row from the one or more redistributed data rows to the allocated free normal storage data block when the free normal storage block is available write, by the machine, a redistributed data row from the one or more redistributed data rows to the allocated fast access storage data block when the free normal storage block is unavailable; and join result files in a combined result file and returning the combined result file to a requesting system.

14. The machine-readable medium of claim 13, wherein the medium further comprises instructions causing the machine to:

selectively allocate a normal storage data block to the intermediate file from a normal storage pool based on the determination that the fast access storage flag is not set; and write the redistributed data row from the one or more redistributed data rows to the allocated fast access storage data block.

15. The machine-readable medium of claim 14, wherein the medium further comprises instructions causing the machine to:

read one or more data rows from a storage device of the one or more storage devices using a source context from the processing step, the source context identifying the one or more data rows on the storage device; and generate one or more data rows from the one or more data rows read from the storage device based on an operation in the source context of the processing step.

16. The machine-readable medium of claim 15, wherein the medium further comprises instructions causing the machine to:

determine whether the processing step requires redistribution of the generated one or more data rows;

redistribute the generated one or more data rows from the access module processor to a plurality of access module processors including the access module processor, each of the plurality of access module processors redistributing its own generated one or more data rows from an associated storage device; and receive the one or more redistributed data rows from the plurality of the access module processors at the access module processor.

17. The machine-readable medium of claim 13, wherein the medium further comprises instructions causing the machine to:

convert a query against the database received from a requesting system into a parse tree including a plurality of nodes;

resolve the parse tree into a resolved parse tree associating one or more of the plurality of nodes with numeric identification data;

determine an optimized plan tree from the resolved parse tree, the optimized plan tree including a source sub-tree that represents the table and a sink sub-tree that represents the intermediate file;

determine whether the intermediate file is to be stored in fast access storage using fast access related information;

insert a fast access storage node to the sink sub-tree based on the determination that the intermediate file is to be stored in fast access storage;

generate the processing step from the optimized plan tree; and dispatch the processing step to a plurality of access module processors including the access module processor.

18. The machine-readable medium of claim 17, wherein the medium further comprises instructions causing the machine to:

determine the table is to be redistributed from the one or more storage devices; and insert a redistribution node to the sink sub-tree based on the determination that the table is to be redistributed.

* * * * *